United States Patent Office 3,278,271
Patented Oct. 11, 1966

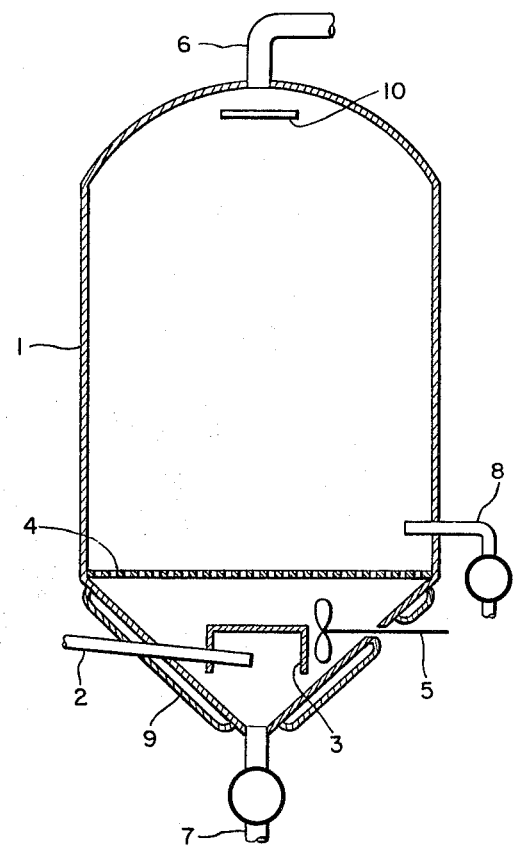

3,278,271
APPARATUS FOR VAPOR-LIQUID CONTACT
Yuichi Kono, Odawara-shi, Kanagawa-ken, Masaru Yoshikawa, Ashigarakami-gun, and Shigeru Matsumoto, Odawara-shi, Kanagawa-ken, Japan, assignors to Fuji Shashin Film Kabushiki Kaisha, Kanagawa-ken, Japan, a corporation of Japan
Filed Jan. 20, 1964, Ser. No. 338,710
Claims priority, application Japan, Jan. 24, 1963, 37/2,535
1 Claim. (Cl. 23—285)

This invention relates to an apparatus for effecting a reaction of a liquid phase and a vapor phase, and more particularly to an apparatus suitable for effecting a reaction by suspending fine powders of an insoluble substance suspended in a reaction medium in liquid phase and contacting the suspension with a vapor phase.

For carrying out the above-mentioned reaction, an ejector system has been employed heretofore with a relatively high efficiency. However, the system has disadvantages in that the runner of the circulating pump for the medium is worn down more or less by the type of the suspending substance in the medium, which results in reducing gradually the reaction efficiency, and that, when the reaction is effected under a reduced pressure, the runner abrasion combines with air leakage from the gland or other troubles to make it necessary to discontinue the reaction or to take constant caution against such troubles.

The present invention provides a reactor which can cause reaction always with a good efficiency regardless of whether the reacting matters contain suspendings or not, or, if any, regardless of the type thereof, even under a reduced pressure.

That is, this invention provides an apparatus for reaction by contact of vapor and liquid phases, equipped with a cyclone mechanism as a means for introduction of a vapor phase.

The invention is described in further detail hereunder with reference to a figure showing an embodiment thereof. In the figure, numeral 1 indicates a main reactor body. It is preferable that the form of the bottom of the reactor is conical as shown in the figure. Into this main body is introduced a reaction liquid, or a reaction medium in which an insoluble substance such as a catalyst or the like is suspended. A pipe 2 for introducing a reaction gas is inserted into the bottom of the body 1 such that the end of said pipe is opened at the inside wall of a member 3. The member 3 is open only at the bottom, and forms a cyclone-type structure with said pipe. Numeral 4 designates dispersing plates; 5, a stirrer; 6, a pipe for discharging a gas phase such as a waste gas; 7, an exhaust pipe for discharging the reacted solution; 8, a pipe for charging into the reactor body a reaction liquid or a reaction medium containing a suspended catalyst; 9, a jacket for warming the reactor body; and 10, a splasher.

A vapor introduced with pressure or under a reduced pressure is caused to revolve with a high speed in member 3, gushes out uniformly from the bottom of 3 along the lower end of the side wall thereof, and is brought into close-contact with the reacting matter by the cooperative action of the dispersing plates 4 and the stirrer 5. Thus the reaction proceeds with a good efficiency. According to the apparatus of the invention, there occurs no gradual diminution of the reaction efficiency during the operation.

Example

In this example, hydroquinone is produced by blowing hot benzoquinone vapor into water in which iron powders are suspended to reduce itself to hydroquinone. In this case it is preferred to carry out the distillation under a reduced pressure, because benzoquinone is sublimative. If the reduction is also carried out under the reduced pressure, hydroquinone can be produced by a continuous process.

In main vessel 1 of this invention, shown in the drawing, was placed 3,000 liters of water suspended with 400 kg. of iron powders finer than 200 meshes in grain size. The pipe 6 was connected with a reducing pump through a cooler. Benzoquinone vapor distilled at about 70° C. was introduced through conduit 2 at 200 mm. Hg, and was caused to react with the liquid in vessel 1. The concentration of hydroquinone was regulated by adjusting the heating temperature and the pressure. By discharging the product from the reaction through pipe 7 after the reaction was finished, followed by filtering and cooling, hydroquinone crystals having a good quality was obtained directly with a good yield.

What is claimed is:
An apparatus for a vapor-liquid reaction comprising a reaction vessel having a conical bottom; a cyclone means for introducing a vapor, said cyclone means being positioned near the bottom of the reaction vessel and consisting of a cyclone chamber having an open bottom and a vapor inlet pipe having an end opened at the inside wall of the cyclone chamber; a dispersing plate positioned above the cyclone means; a liquid inlet positioned above the dispersing plate; and at least one stirrer positioned below the stirring plate.

References Cited by the Examiner
UNITED STATES PATENTS
2,769,000  10/1956  Van Krevelen et al. __ 23—252 X MORRIS O. WOLK, *Primary Examiner.*
JAMES H. TAYMAN, Jr., *Examiner.*